US012756814B2

(12) United States Patent

Panesar et al.

(10) Patent No.: US 12,756,814 B2

(45) Date of Patent: *Oct. 6, 2026

(54) HARDWARE-BASED SENSOR ANALYSIS

(71) Applicant: Siemens Industry Software Inc., Plano, TX (US)

(72) Inventors: Gajinder Panesar, Cambridge (GB); Marcin Hlond, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 401 days.

This patent is subject to a terminal disclaimer.

(21) Appl. No.: 18/681,781

(22) PCT Filed: Aug. 31, 2021

(86) PCT No.: PCT/US2021/048430

§ 371 (c)(1),
(2) Date: Feb. 6, 2024

(87) PCT Pub. No.: WO2023/033804

PCT Pub. Date: Mar. 9, 2023

(65) Prior Publication Data

US 2024/0348768 A1 Oct. 17, 2024

(51) Int. Cl.
*H04N 17/00* (2006.01)
*G01J 1/44* (2006.01)

(52) U.S. Cl.
CPC .............. *H04N 17/002* (2013.01); *G01J 1/44* (2013.01); *G01J 2001/444* (2013.01)

(58) Field of Classification Search
CPC ................................ H04N 17/002; G01J 1/44
See application file for complete search history.

(56) References Cited

U.S. PATENT DOCUMENTS 5,291,189 A 3/1994 Otake et al.
5,904,959 A 5/1999 Martin
2009/0282308 A1 11/2009 Gutsche et al.
2011/0113313 A1* 5/2011 Thiesfeld ................ G06F 11/10 714/E11.032
2014/0294229 A1 10/2014 Le Guelvouit et al.
(Continued)

FOREIGN PATENT DOCUMENTS

CN 101358106 A 2/2009
CN 102382547 A 3/2012
(Continued)

OTHER PUBLICATIONS

International Search Report and Written Opinion for International App. No. PCT/US2021/048430 mailed Jun. 2, 2022.
(Continued)

*Primary Examiner* — Jigar P Patel
(74) *Attorney, Agent, or Firm* — Lempia Summerfield Katz LLC

(57) ABSTRACT

A method of monitoring messages from a sensor using an integrated circuit is provided, wherein the messages include data measured by that sensor. The method includes reading a first message from interconnect circuitry of the integrated circuit, the interconnect circuitry connecting the sensor to one or more core devices configured to process the message. The method further includes calculating a first hash value for the first message and comparing the first hash value to one or more prior hash values stored in a hash store, wherein each prior hash value corresponds to a message that was read from the interconnect circuitry prior to the first message. The method further includes performing a corrective action when the difference between the first hash value and at least one of the prior hash values stored in the hash store is above a predetermined threshold.

21 Claims, 6 Drawing Sheets

(56) References Cited

U.S. PATENT DOCUMENTS

| | | | |
|---|---|---|---|
| 2014/0335839 | A1 | 11/2014 | Rubin et al. |
| 2015/0307759 | A1 | 10/2015 | Bordoloi et al. |
| 2015/0372910 | A1 | 12/2015 | Janakiraman et al. |
| 2016/0227235 | A1 | 8/2016 | Frishman et al. |
| 2019/0014176 | A1 | 1/2019 | Tormasov et al. |
| 2019/0026917 | A1 | 1/2019 | Liao et al. |
| 2020/0074275 | A1* | 3/2020 | Xia ...................... G06N 3/0442 |
| 2020/0142610 | A1 | 5/2020 | Noll et al. |
| 2020/0169382 | A1* | 5/2020 | Factor ................... G06F 3/0641 |
| 2020/0301776 | A1 | 9/2020 | Cha |
| 2020/0302241 | A1 | 9/2020 | White et al. |
| 2021/0234710 | A1* | 7/2021 | Facon ................... H04L 9/3278 |

FOREIGN PATENT DOCUMENTS

| | | | |
|---|---|---|---|
| CN | 104212339 | A | 12/2014 |
| CN | 110085277 | A | 8/2019 |
| EP | 3647954 | A1 | 5/2020 |
| JP | H11293114 | A | 10/1999 |
| JP | 2011028516 | A | 2/2011 |
| JP | 2017011502 | A | 1/2017 |
| JP | 2018157376 | A | 10/2018 |
| KR | 20150022200 | A | 3/2015 |
| RU | 2337391 | C1 | 10/2008 |
| WO | 0233558 | A1 | 4/2002 |
| WO | 2012058657 | A2 | 5/2012 |
| WO | 2016065346 | A1 | 4/2016 |
| WO | 2016090468 | A1 | 6/2016 |
| WO | 2021243034 | A1 | 12/2021 |

OTHER PUBLICATIONS

Sigg, Christian, "Representation and Rendering of Implicit Surfaces," Dissertation, ETH Zurich, (2006), pp. 1-162.

* cited by examiner

HARDWARE-BASED SENSOR ANALYSIS

The present patent document is a § 371 nationalization of PCT Application Serial No. PCT/US2021/048430, filed Aug. 31, 2021, designating the United States, which is incorporated by reference in its entirety.

TECHNICAL FIELD

This disclosure relates to the monitoring of messages from a sensor using monitoring circuitry within a System on a Chip (SoC) or Multi-chip Module (MCM).

BACKGROUND

Integrated circuit chips may be used to monitor data messages that are recorded by a sensor. The recorded data messages may be used to detect a failure of the sensor that results in an inability of the sensor to refresh, either wholly or partially, the messages that it records. Such a failure of the sensor will result in an inability to record problems occurring within the system in which it is implemented. To detect the failure of a sensor in known integrated circuit chip arrangements, data messages that are recorded by a sensor are monitored by first writing these messages to a memory connected to the integrated circuit chip. Once the messages have been written to memory, they may then be read from the memory and processed by software included within one or more processing modules on the chip.

An example of a sensor that may be used to indicate problems occurring within a system is an image sensor, such as a camera. Where the sensor is an image sensor, each data message recorded by that sensor is, for example, an image frame or line of pixels or other sub-division of an image frame that is captured at a given time window. Image frames captured over subsequent time windows are compared by monitoring software to determine whether a problem has occurred. A small difference in the image frames recorded by the sensor over time may be used to indicate a failure in an entity being monitored by the sensor.

The requirement of the integrated circuit chip to store data messages in a memory before those messages may be processed by monitoring software introduces a significant time delay in detecting the failure of a system being monitored by a sensor. This is problematic for implementations in which there is a strong reliance on sensor data to identify problems within the system in which the sensor is implemented, so that a response to these problems may be performed with a minimal time delay. For example, where the sensor is an image sensor, the sensor may be required to recognize upcoming external objects and trigger a response to the approach of these objects.

It would also be desirable to be able to use such a system to monitor a change within an entity being monitored, which may indicate a critical situation. For example, when monitoring a nuclear reactor, the integrity of the reactor structure is critical in providing its safety, therefore knowing when there is deformation of the reactor structure is absolutely vital. If such a failure were to be detected using a sensor in known integrated circuit chip arrangements, data messages that would be recorded by the sensor would suffer from the same issues of time delays as those described above. This would lead to the additional problem that events where the timeliness of any notification may make the difference between being able to take corrective action may be inadequately monitored or, in a worst-case scenario, missed altogether.

There is a need to reduce the time taken to monitor data messages that are recorded by a sensor, particularly when inspecting an entity for a time-critical change.

SUMMARY

The scope of the present disclosure is defined solely by the appended claims and is not affected to any degree by the statements within this summary. The present embodiments may obviate one or more of the drawbacks or limitations in the related art.

According to a first aspect, a method of monitoring messages from a sensor using an integrated circuit is provided, wherein the messages include data measured by that sensor. The method includes: reading a first message from interconnect circuitry of the integrated circuit, the interconnect circuitry connecting the sensor to one or more core devices configured to process the message; calculating a first hash value for the first message; comparing the first hash value to one or more prior hash values stored in a hash store, each prior hash value corresponding to a message that was read from the interconnect circuitry prior to the first message; and performing a corrective action if the difference between the first hash value and at least one of the prior hash values stored in the hash store is above a predetermined threshold.

The processes of observing an issue, processing the data, and notifying that the issue has been observed happen within a timescale of nanoseconds, based on the processing capabilities of the integrated circuit, hence by comparing any difference in hash values to a predetermined threshold it is possible to utilize the method to monitor messages from systems designed to observe entities in real-time to and to effectively alert when a change occurs in such an entity that is time critical.

The method may further include storing the first hash value in the hash store. The first hash value may be stored in the hash store simultaneously to the comparison of the first hash value to the prior hash values.

The method may further include buffering the first message before the first message is read by the one or more core devices. The size of the buffer may correspond to the number of data values that are used to calculate a data hash including the first hash value.

The method may further include comparing the first hash value to a number M of prior hash values, and performing a corrective action if the difference between the first hash value and P prior hash values is above the predetermined threshold, where $1<P<M$. If this is done, then the method may further include deriving a confidence value corresponding to the P prior hash values for which the difference between the first hash value and each value of the P prior hash values is above the predetermined threshold. The number M of prior hash values may be dynamically configurable.

A corrective action may be performed if the first hash value is different from at least one of the prior hash values stored in the hash store.

The method may further include calculating a plurality of hash values for the first message, each hash value of the plurality of hash values representing a portion of the first message, and wherein each hash value of the plurality of hash values for the first message is compared to one or more prior hash values that correspond to that portion of the first message. The plurality of hash values calculated for the first message may represent overlapping portions of the first message. Alternatively, the plurality of hash values calculated for the first message may represent non-overlapping portions of the first message.

The corrective action may be one or more of: informing a user that the sensor data is not reliable, disactivating components of the integrated circuit that depend on data obtained from the sensor, and activating a mechanism configured to repair the sensor.

The corrective action may include outputting an alert signal to another component of the integrated circuit.

The corrective action may include outputting a hardware event, outputting an interrupt signal, or outputting a message to an external core device.

The sensor may be an image sensor, and each message that is read from the interconnect circuitry may be at least a portion of a frame that is captured by the image sensor.

The sensor may be an image sensor, and each message that is read from the interconnect circuitry may be a frame that is captured by the image sensor.

The integrated circuit may be a system on a chip. The interconnect circuitry may be a data bus.

In a second aspect, an integrated circuit chip for monitoring messages from a sensor is provided, wherein the messages include data measured by that sensor. The integrated circuit chip includes: interconnect circuitry connecting the sensor to a core device configured to process the message; a monitoring device configured to read a first message from the interconnect circuitry; a hash store for storing a plurality of prior hash values, each hash value corresponding to a message that was read from the interconnect circuitry prior to the first message; and a device configured to calculate a first hash value for the first message and compare the first hash value to one or more of the prior hash values stored in the hash store. The integrated circuit is configured to perform a corrective action if the difference between the first hash value and at least one of the prior hash values stored in the hash store is above a predetermined threshold.

The device may be a processor or a series of finite state machines.

BRIEF DESCRIPTION OF THE DRAWINGS

The present disclosure is now described by way of example with reference to the accompanying drawings.

DETAILED DESCRIPTION

Figure 5:
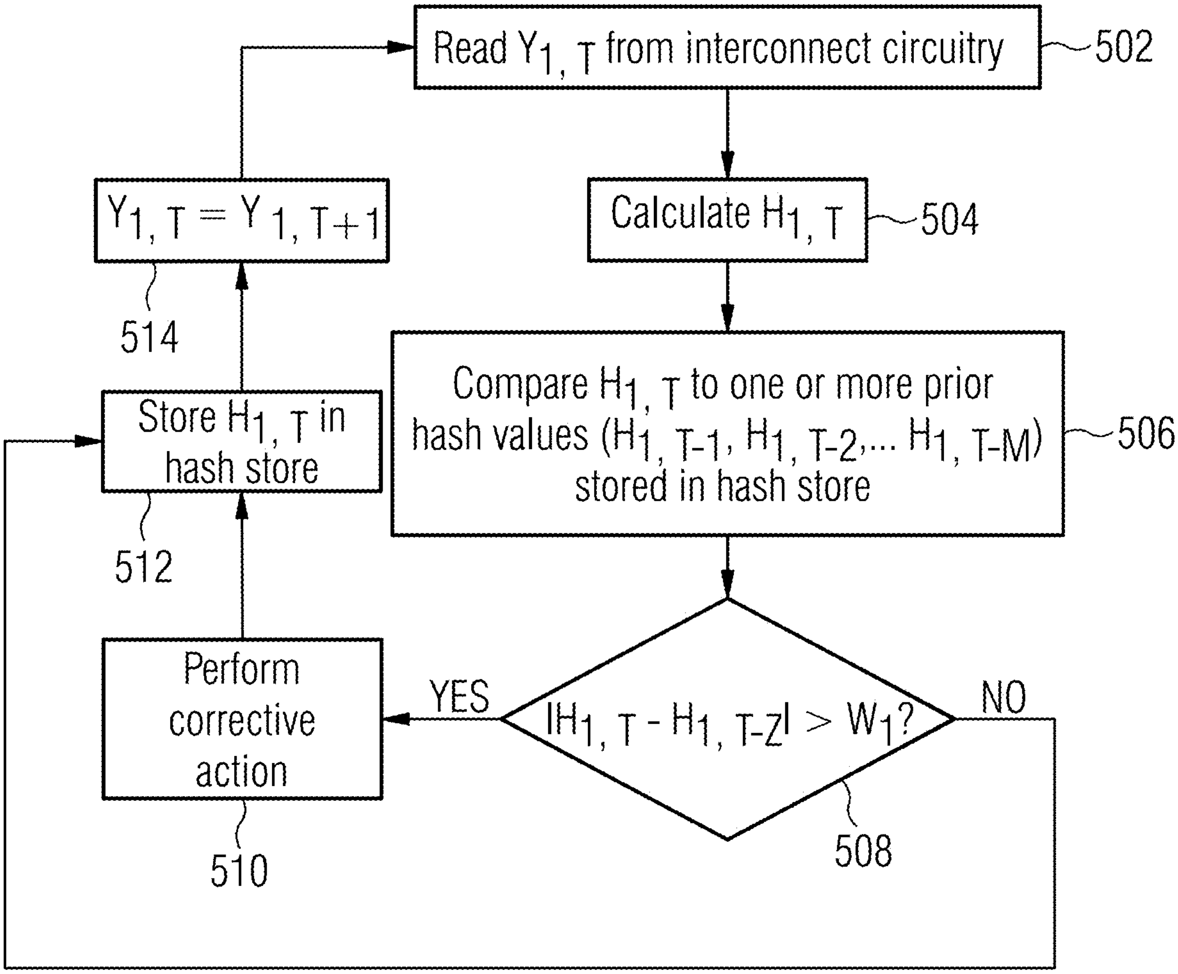
FIG. 5 is a flowchart of an exemplary method of monitoring messages from a sensor using an integrated circuit chip device as illustrated in FIG. 2 or 4.
Figure 6:
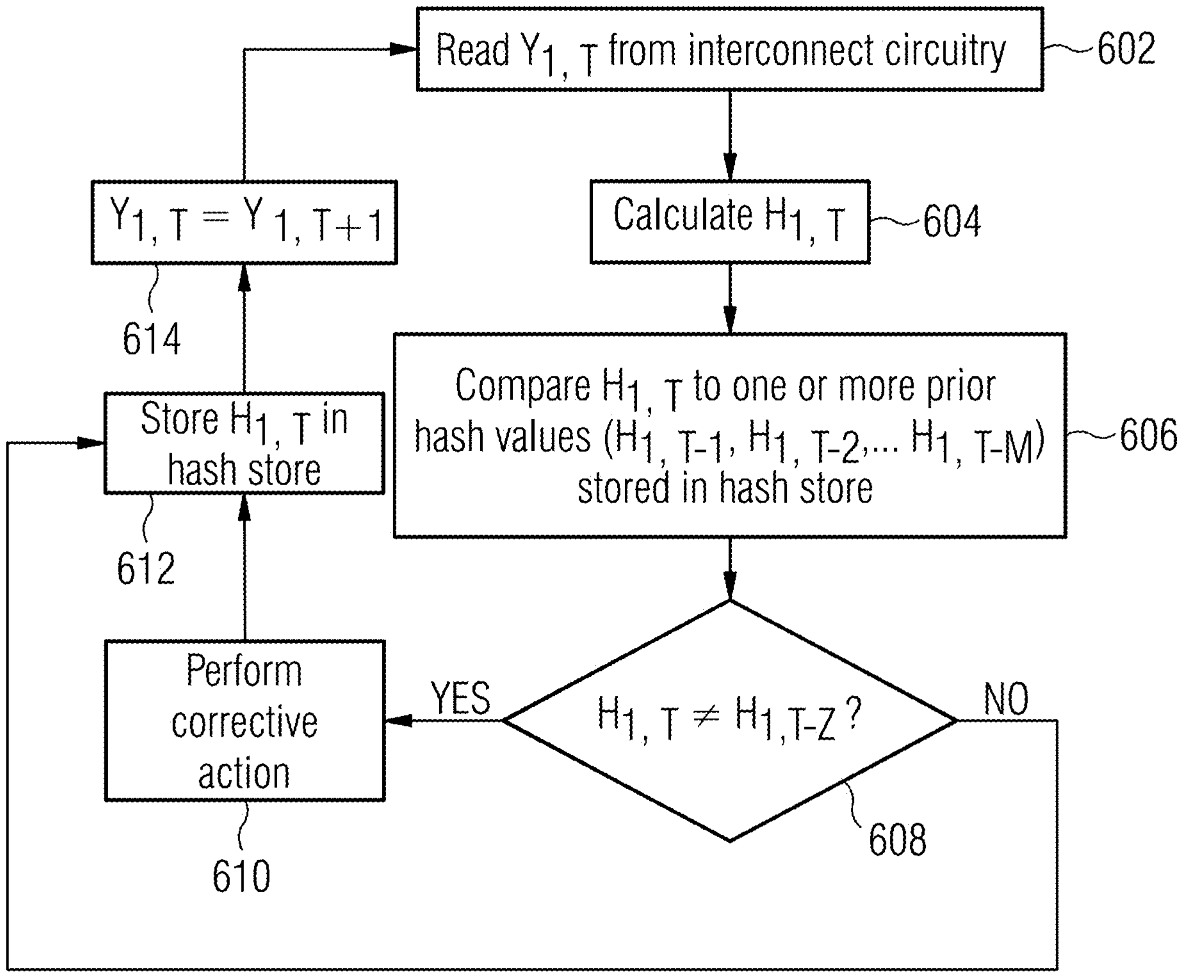
FIG. 6 is a flowchart of an alternative exemplary method of monitoring messages from a sensor using an integrated circuit chip device as illustrated in FIG. 2 or 4.

FIGS. 1 to 4 are schematic diagrams of exemplary system architectures, and components within the system architectures. These figures present the structures in terms of functional blocks. Some functional blocks for carrying out functions well known in the art have in places been omitted from these figures. FIGS. 5 and 6 are flowcharts illustrating methods of monitoring sensor messages using system architectures of FIGS. 1 to 4. Each flowchart depicts an order in which the method of that flowchart may be performed. However, the flowcharts are not intended to restrict the described methods to being implemented in the orders depicted. The acts of the methods may be carried out in alternative orders to those depicted in the flowcharts.

Figure 1:
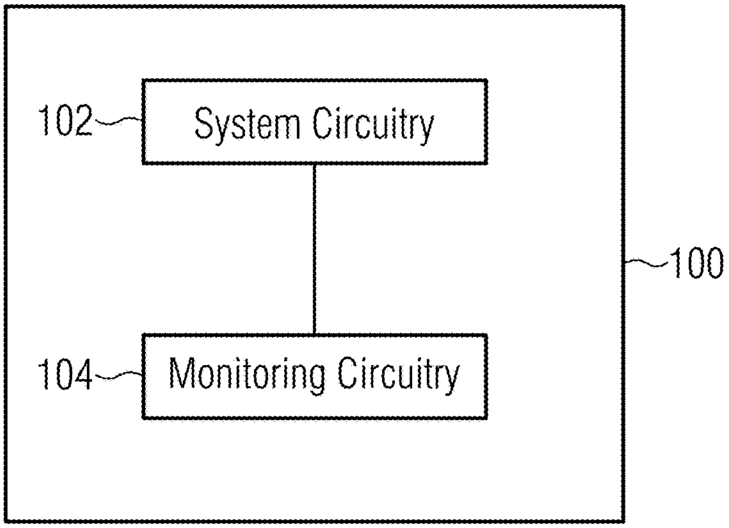
FIG. 1 is a schematic drawing of an exemplary integrated circuit chip device.

FIG. 1 illustrates the general structure of an exemplary monitoring network for a SoC 100. Monitoring circuitry 104 is arranged to monitor system circuitry 102.

Figure 2:
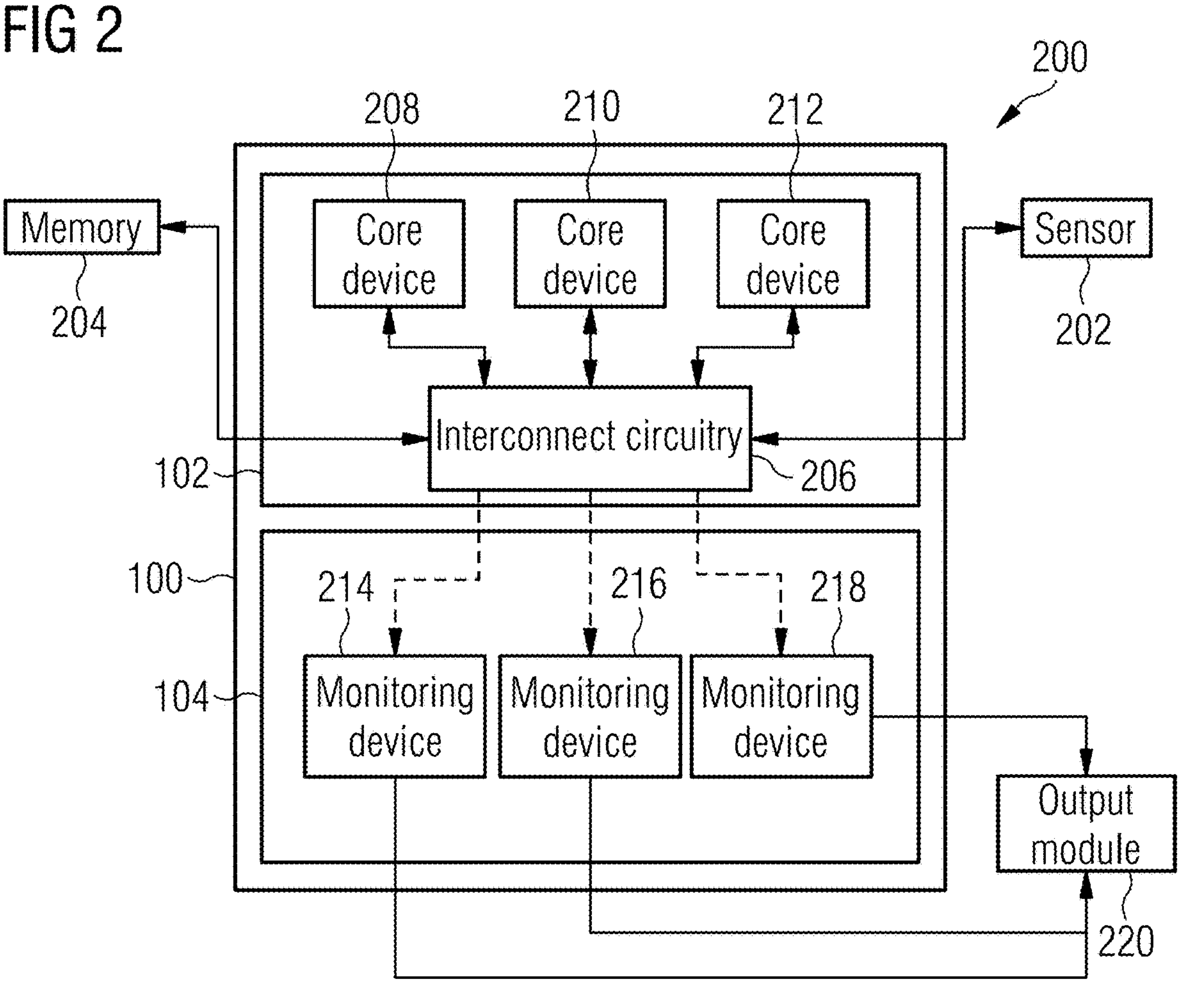
FIG. 2 is a schematic drawing of an exemplary system for monitoring data messages using an integrated circuit chip device.

FIG. 2 illustrates an exemplary system 200 including an integrated circuit chip 100, such as an SoC, 200 for monitoring data messages received from a sensor 202. The messages are referred to as data messages because they include one or more distinct data values that are recorded by the sensor. The sensor 202 may be any type of sensor that is capable of recording data periodically. That is, the sensor 202 may be capable of recording data continuously, or periodically at regular time windows. Each time window may otherwise be referred to as a number of clock cycles of the integrated circuit chip. In one example, the sensor 202 is an image sensor such as a camera, and each data message that is recorded by the sensor is an image frame.

As well as the sensor 202, the SoC 100 is also connected to a memory 204. The sensor 202 is therefore connected to the memory 204 by the SoC 100. In FIG. 2, the memory 204 is an external memory. An external memory is a memory that is not included within the SoC 100. In an alternative example, the memory 204 may be an internal memory, and so may be included within the SoC 100. The memory 204 is configured to store data messages that are recorded by the sensor 202, and that are transmitted to the memory 204 through the SoC 100.

As with FIG. 1, the SoC in FIG. 2 includes system circuitry 102 and monitoring circuitry 104. The system circuitry 102 includes interconnect circuitry 206 and one or more core devices 208, 210, 212. The interconnect circuitry 206 connects the sensor 202 and the memory 204 to the core devices 208, 210, 212 and also connects the core devices 208, 210, 212 to each other. The interconnect circuitry 206 therefore enables the transfer of data between the sensor 202, the memory 204, and the core devices 208, 210, 212. In one example, the core devices 208, 210, 212 are master devices. In an alternative example, the core devices 208, 210, 212 are a combination of master and slave devices. One or more of the core devices 208, 210, 212 are configured to process data messages received from the sensor 202. To enable the processing of data, the one or more core devices 208, 210, 212 include suitable system software. Although in FIG. 2 the SoC is illustrated as including three core devices, any number of core devices may be suitably integrated into the system circuitry. The SoC interconnect forms a communication backbone for the SoC, through which the core devices may communicate with each other. These communications are bi-directional.

Master devices are those which initiate traffic, such as read/write requests in a network. Examples of master devices are processors such as a DSP (digital signal processor), video processor, applications processor, CPU (central processor unit), and GPU (graphics processor unit). Any programmable processor may be a master device. Other examples of master devices are those with DMA (direct memory access) capability, such as conventional DMAs for moving data from one location to another, autonomous coprocessors with DMA capability (such as an encryption engine), and peripherals with DMA capability (such as an Ethernet controller).

Slave devices are those which respond to the commands of the master devices. Examples of slave devices are on-chip memories, memory controllers for off-chip memories (such as DRAM), and peripheral units.

The topology of the interconnect circuitry 206 is SoC dependent. For example, it may include any one or combination of the following types of network to transport communications around the system circuitry: a bus network, a ring network, a tree network, or a mesh network. In one example, the interconnect circuitry is a data bus.

As mentioned above, the core devices 208, 210, 212 of system circuitry 102 are configured to process data messages recorded by the sensor 202. The core devices 208, 210, 212 perform this data processing using suitable system software. In order for the data messages to be processed, they are first written to the memory 204. That is, once the data messages have been written to the memory 204, they may be read by one or more core devices 208, 210, 212 for processing. The data may be processed by software included within the one or more core devices 208, 210, 212 by comparing a recently obtained data value to prior data values that are stored in the memory 204. In one example, a dissimilarity between the data values obtained from consecutive data messages indicates the occurrence of a change in an entity that the sensor 202 is monitoring. That is, the sensor 202 may record differing data values where the conditions in the system within which the sensor is implemented are changing.

In the example where the sensor 202 is an image sensor, the detection of differing data values that are recorded by the sensor may indicate that the image sensor is monitoring a change that is now occurring in an entity. Rather than the sensor refreshing the messages that are being recorded identically, for example, all of the image frames or portions thereof recorded are identical, the sensor may instead record a message that is different to preceding messages. This indicates a change within the entity being monitored, which may indicate a critical situation. For example, when monitoring a nuclear reactor, the integrity of the reactor structure is critical in providing its safety, therefore knowing when there is deformation of the reactor structure is absolutely vital.

A disadvantage of using system circuitry 102 to process data messages recorded by the sensor 202 is that it results in a significant time delay from the change in messages from the sensor to the detection of the change in the entity being monitored. That is, the sensor data has to be written into memory 204 before it may be read and processed by the software included within the core devices 208, 210, 212. The time taken to store and process data messages may be in the order of tens of milliseconds to hundreds of milliseconds. This is too slow for some integrated systems, which require faster failure detection mechanisms to allow a suitable amount of time for a reaction to a change in the entity to be implemented.

In order to provide a faster method of monitoring data messages recorded by the sensor 202, monitoring circuitry 104 includes one or more monitoring devices 214, 216, 218. The monitoring devices 214, 216, 218 are connected to interconnect circuitry 206. The monitoring devices 214, 216, 218 are configured to non-intrusively read data messages from the interconnect circuitry 206. The data messages from the interconnect circuitry 206 are messages that have been transmitted by the sensor 202 across the interconnect circuitry 206 before they arrive at the memory 204. These data messages are read by the core devices 208, 210, 212 without extracting them from the interconnect circuitry 206. Instead of the system software that is used by the core devices 208, 210, 212, the monitoring devices 214, 216, 218 are configured to read and subsequently process data messages using an arrangement of hardware components.

The monitoring devices 214, 216, 218 may be configured to selectively read only data messages that have been transmitted by the sensor 202. That is, the monitoring devices 214, 216, 218 may be configured to filter out all messages that are not data messages from the sensor, and that are transmitted across the interconnect circuitry 206, if such messages are present. The monitoring devices 214, 216, 218 are further configured to read these data messages autonomously, without any software intervention.

In one example, messages transmitted across the interconnect circuitry 206 may be accompanied by a flag identifying the module from which they have been transmitted. The monitoring devices 214, 216, 218 may be configured to filter out messages that are not data messages transmitted by the sensor 202 by observing this identification flag. In other words, the monitoring devices 214, 216, 218 may selectively read only data messages including a flag identifying the sensor 202 as the module from which they have been transmitted.

In another example, the messages transmitted across the interconnect circuitry 206 are accompanied by a flag indicating the module to which they are to be written. The monitoring devices 214, 216, 218 may therefore selectively read only data messages including a flag identifying an address within the memory 204 to which they are to be written.

Although in FIG. 2 the SoC is illustrated as including three monitoring devices, any number of monitoring devices may be suitably integrated into the integrated circuit chip 100. Each monitoring device 214, 216, 218 may be connected to the interconnect circuitry 206 by a single communication link. Alternatively, one or more devices units 214, 216, 218 may be connected to a plurality of communication links. The monitoring devices 214, 216, 218 are further configured to monitor data messages that have been read from the interconnect circuitry 206, and to determine whether those messages include data values that are indicative of a change in the entity that the sensor 202 is monitoring.

In addition to the interconnect circuitry 206, the monitoring devices 214, 216, 218 are connected to an output module 220. The output module 220 is configured to perform a corrective action if the one or more monitoring devices 214, 216, 218 determine that the data values included within the data messages are indicative of the sensor detecting a change in the entity. That is, the monitoring devices 214, 216, 218 are configured to instruct the output module 220 to perform a corrective action if they determine that the data values included within the data messages are indicative of the sensor detecting a change in an entity.

In FIG. 2, the system includes one output module 220, however the circuitry may include any number of output modules 220. Although the output module 220 of FIG. 2 is illustrated as being external to the integrated circuit chip 100, the output module 220 may alternatively be included within the integrated circuit chip. Where the circuitry includes more than one output module 220, each output module may be configured to perform a different corrective action in response to the determination from the one or more monitoring devices 214, 216, 218 that the read data is indicative of a change in the entity.

Figure 3:
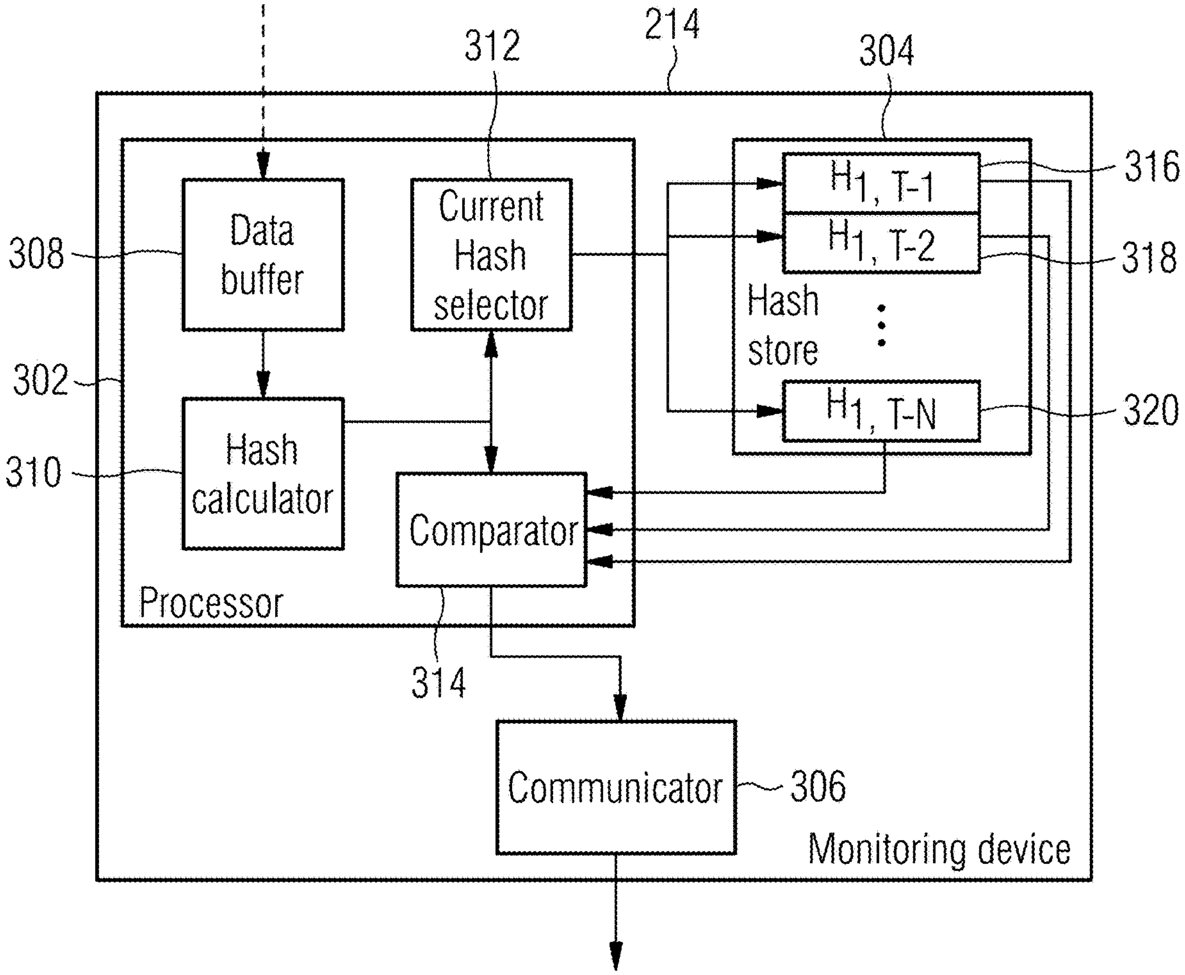
FIG. 3 is a detailed embodiment of a monitoring device of the integrated circuit chip device illustrated in FIG. 2.

FIG. 3 is a detailed embodiment of a monitoring device 214 of the integrated circuit chip illustrated in FIGS. 1 and 2. The monitoring device 214 is able to read and monitor data messages from the interconnect circuitry 206 using an arrangement of hardware components, and without the intervention of any system software. These hardware components include a processor 302 which is connected to both a data store 304 and a communicator 306.

The processor 302 of monitoring device 214 is configured to calculate a first hash value for a first message that is received from the interconnect circuitry 102. The hash store 304 is a memory storage that is configured to store a plurality of prior hash values, where each stored hash value corresponds to a message that was read from the interconnect circuitry prior to the first message. The processor 302 is further configured to compare the at least one hash value that has been calculated for the first message to one or more of the prior hash values stored in the hash store 304. If processor 302 determines that the difference between the first hash value and at least one of the prior hash values stored in the hash store is below a predetermined threshold that is identified by the processor 302, the processor outputs a signal to the communicator 306. On receiving this signal, the communicator 306 is then configured to instruct an output module 220 connected to the integrated circuit to perform a corrective action.

In this embodiment, the processor 302 of the monitoring device 214 further includes a data buffer 308 which is connected to a hash calculator 310. In addition to the data buffer 308, the hash calculator 310 is connected to both a current hash selector 312 and a comparator 314. Both the current hash selector 312 and the comparator 314 are connected to the hash store 304. The comparator 314 is further connected to the communicator 306. Alternatively, the present disclosure may be entirely implemented in appropriate hardware, such as a DNA machine surrounded by or couple to a number of finite state machines. For example, the finite state machines may be arranged to carry out the following acts: fetch image data; calculate hash value; fetch hash value from memory; compare hash values; and, if different, output a trigger event. An SDL state machine may be used, for example. A finite state machine may include a programmable logic device, a programmable logic controller, logic gates, and flip flops or relays.

The data buffer 308 is configured to receive data messages that are read from the interconnect circuitry 206, and to store those received data messages for a short period of time. The data buffer 308 then transfers the received data messages to the hash calculator 310. As has been summarized above, a first data message that is received by the data buffer 308 is a data message that has been read from the interconnect circuitry 206 before that data message has been received by and written to the memory 204 connected to the integrated circuit chip 100. Thus, the data buffer 308 receives a first data message before that data message is read from the memory 204 by the one or more core devices 208, 210, 212.

The data buffer 308 may be of a predetermined size. In one example, the size of the data buffer 308 is the same as the size of the data messages that are received by that buffer. In other words, the size of the data buffer 308 is the same as the size of a first message received by the buffer. The data buffer 308 is therefore configured to store only a data message recorded at one clock cycle. In an alternative example, the size of the data buffer 308 is the size of only a subset of data values that are included within the first data message. In this alternative example, the size of the buffer corresponds to the size of the hash that is calculated by the hash calculator 310. The data buffer 308 is therefore configured to store only a subset of data values included within one data message at any one clock cycle. The hash size is described in further detail below.

The hash calculator 310 is configured to calculate one or more data hash or hash value for each data message that is received from the data buffer 308. Each data hash includes a hash value that represents the data values from the message used to calculate that hash. It has been mentioned above that each data message that is received from the data buffer 308 includes one or more distinct data values. Each data message may therefore include a plurality of data values. In one example, the hash calculator 310 is configured to calculate one data hash for all of the data values of a received data message. In an alternative example, the hash calculator 310 is configured to calculate a plurality of data hashes for each received data message. In this alternative example, for a first data message, each hash value is calculated for a subset of data values of that data message. The subset may include one or more data values from the first data message. That is, each hash value that is calculated for the first data message represents a portion of that data message.

Each data hash that is calculated by the hash calculator 310 is of a predefined hash size, where the hash size indicates the number of data values that are used to calculate that hash. The hash size is configurable by an operator of the integrated circuit chip. In one example, the hash size is configurable by the operator at the instantiation time of the integrated circuit chip 100. In an alternative example, the hash size is configurable dynamically. That is, the hash size is configurable during operation of the integrated circuit chip 100.

In an example where the sensor is an image sensor, each data message that is read from the interconnect circuitry 206 is an image frame, line of pixels, or other sub-division of an image frame. In other words, each data message is at least a portion of the image frame. Each data value of a given message may therefore be a pixel of an image frame. Thus, in one example the hash calculator 310 is configured to calculate a data hash for all of the pixels of a first image frame. In an alternative example, the hash calculator 310 is configured to calculate a data hash for each of a defined subset of pixels of the first image frame. The subset of pixels may be determined by the transfer scheme used by the image sensor to transfer pixel data off-chip. For example, for an image frame containing n×m pixels, a subset of n×1, or y×x, where y<n and x<m may be transmitted. This depends on the size of the data packet that may be handled by the integrated chip.

In the example in which the hash calculator 310 is configured to calculate more than one data hash for each data message received from the data buffer 308, it may use the data values of a data message to form either a rolling or a non-overlapping input to form these hash values. A rolling input is one in which there is a significant overlap in the data values that are used to calculate consecutive hashes. That is, the hashes calculated for each data message represent overlapping subsets of data, or portions, of that message. An example of a set of data hashes obtained from rolling inputs may be demonstrated as follows:

$$H_1 = f(X_1, X_2 \ldots X_N)$$

-continued $$H_2 = f(X_2, X_3 \ldots X_{N+1})$$

$$H_3 = f(X_3, X_4 \ldots X_{N+2})$$

In the above demonstration, $H_1$, $H_2$, and $H_3$ are each indicative of a value of a data hash obtained from a subset of data values $X_1, X_2, \ldots, X_{N+2}$ in a first data message $Y_1$. In the example provided above, the inputs to data hash $H_1$ and data hash $H_2$ differ by 1 data value. Similarly, the inputs to data hash $H_2$ and data hash $H_3$ differ by 1 data value. In alternative examples, the inputs between consecutive data hashes may differ by a greater number of data values.

A non-overlapping input is one in which there is no overlap between the data values that are used to form consecutive hash values. That is, hash values calculated for each data message represent non-overlapping portions of that message. An example of a set of data hashes obtained from non-overlapping inputs may be demonstrated as follows:

$$H_1 = f(X_1, X_2 \ldots X_N)$$

$$H_2 = f(X_{N+1}, X_{N+2} \ldots X_{2N})$$

$$H_3 = f(X_{2N+1}, X_{2N+2} \ldots X_{3N})$$

In the above demonstration, $H_1$, $H_2$, and $H_3$ are each indicative of a value of a data hash obtained from a subset of data values $X_1, X_2, \ldots, X_3N$ in a first data message $Y_1$.

The hash store 304 is a memory store that is configured to store a plurality of prior hash values that have been calculated by the hash calculator 310 prior to the receipt of a first data message. The hash store 304 includes a plurality of entries 316, 318, 320, for storing prior hash values calculated by the hash calculator 310.

Each prior hash value that is stored in the hash store 304 corresponds to a data message that has been read by the monitoring device 214 from the interconnect 102 prior to a first data message that is received by the data buffer 308. For each hash value that is calculated for the first data message, the hash store stores prior hash values that have been calculated for the same subset of data values as the subset of data values that have been used to calculate the one or more hash values for a data message, but for a prior clock cycle. For example, a first data message that is recorded by the sensor 202 for a first clock cycle, T, may be represented by the reference $Y_{1,T}$. A first hash value that is calculated from that first data message by the hash calculator 310 may be represented by the reference $H_{1,T}$. The entries 316, 318, 320, may therefore store prior hash values corresponding to data messages $Y_{1,T-1}, Y_{1,T-2}, \ldots, Y_{1,T-N}$ that have been recorded prior to the first data message $Y_{1,T}$. These hash values may be represented as $H_{1,T-1}, H_{1,T-2}, \ldots, H_{1,T-N}$. For example, a first prior hash value $H_{1,T-1}$ may be stored in first entry 316. The hash store may store hash values for any number of prior clock cycles in which data has been received.

Note that, in an alternative example, a first hash value $H_{1,T}$ may be calculated by the hash calculator 310 for only a subset of data values $X_{1,T}, X_{2,T}, \ldots, X_{N,T}$ included within the first message $Y_{1,T}$.

Once a first hash value $H_{1,T}$ for a first data message $Y_{1,T}$ has been calculated by the hash calculator 310, it is transmitted to both the current hash selector 312 and the comparator 314. The current hash selector 312 is configured to receive a hash value for a data hash that has been calculated by the hash calculator 310, and to use that hash value to look up corresponding prior hash values that are stored in the hash store 304. A corresponding prior hash value is a hash value that has been calculated for the subset of data used to form the first data message, or portion of the first data message that has been used to calculate the first hash value, but for a different prior window. So, for a first hash value $H_{1,T}$ that is calculated for a first data message $Y_{1,T}$, the corresponding prior hash values are $H_{1,T-1}$, $H_{1,T-2}$, and so on. That is, the one or more prior hash values $H_{1,T-1}$, $H_{1,T-2}$, etc. are prior hash values that correspond to the first message $Y_{1,T}$ that is used to generate the first hash $H_{1,T}$. Once the corresponding prior hash values in the hash store 304 have been identified, those values are transmitted to the comparator 314.

The comparator 314 is connected to both the hash store 304 and the hash calculator 310. The comparator is thus configured to receive both the first hash values $H_{1,T}$ calculated by the hash calculator 310, and the corresponding prior hash values from the hash store 304. The comparator 314 is further configured to compare the first hash value $H_{1,T}$ received from the hash calculator 310 with one or more corresponding prior hash values stored in the hash store 304. If a first hash value $H_{1,T}$ represents a hash value for a first data message $Y_{1,T}$ for a first clock cycle T, then that hash value will first be compared against prior hash value $H_{1,T-1}$. $H_{1,T}$ may then be compared against prior hash value $H_{1,T-2}$, until $H_{1,T-M}$, where M is the total number of prior hash values to be compared against first hash value $H_{1,T}$. The number M of prior hash values compared to the first hash value is configurable by an operator of the integrated circuit chip. In one example, M is configurable at the instantiation time of the integrated circuit chip 100. In an alternative example, the number M is dynamically configurable. That is, the number M is configurable during operation of the integrated circuit chip 100.

The comparator 314 is configured to compare the difference in the hash value of the first data hash $H_{1,T}$ and each prior hash value $H_{1,T-2} \ldots H_{1,T-M}$ to a predetermined threshold value $W_1$. The value of the predetermined threshold may be stored in the monitoring device 214. In one example, the value of the predetermined threshold is stored in an additional memory of the monitoring device (not shown). This additional memory may alternatively be included within the hash store 304, or in a memory of the comparator 314. Furthermore, the predetermined threshold may be stored at an alternative location within the processor 302, or the monitoring device 214 in general. The comparator 314 is further configured to determine whether the difference between the first hash value $H_{1,T}$ and at least one of the prior hash values $H_{1,T-2} \ldots H_{1,T-M}$ stored in the hash store is below the predetermined threshold $W_1$. That is, the comparator is configured to determine whether $|H_1 - H_{1,T-Z}| < W_1$, where Z=1, 2 . . . M.

In one example, the monitoring device 214 is configured to perform a corrective action if it is determined that the difference between the first hash value $H_{1,T}$ and one prior hash value is above the predetermined threshold $W_1$. In this example, the first hash value is compared to only the hash value that immediately precedes that hash value. If $|H_1 - H_{1,T-1}| < T_1$, a corrective action is performed. By determining that the hash value is above the predetermined threshold $W_1$, the sensor 202 has detected a change in the entity it is monitoring, thus enabling an alarm, corrective action, or other notification to be made.

In an alternative example, the monitoring device 214 is configured to perform a corrective action if it is determined that the difference between the first hash value $H_{1,T}$ and a plurality of prior hash values is above the predetermined threshold $W_1$. In this example, the number of prior hash values P for which the difference between the first hash value and each prior hash value is above the predetermined threshold is predefined by the monitoring device 214. This number of prior hash values P is defined as a fraction of M, where M is the total number of prior hash values to be compared against first hash value $H_{1,T}$ by the comparator 314. Thus, $1<P<M$. As an example, P may be equal to M/2. So, if the number of prior hash values for which $|H_1-(H_{1,T-Z})|>W_1$ is greater than M/2, a corrective action is performed.

If it is determined that the difference between the first hash value $H_{1,T}$ and at least one of the prior hash values stored in the hash store 304, as defined above, is above the predetermined threshold $W_1$, the comparator 314 outputs a signal to communicator 306. The communicator 306 is configured to communicate with one or more output modules 220 that are external to the monitoring device 214. The communicator 306 is therefore responsible for transmitting instructions to the output modules. The instructions are indicative of a corrective action or notification that is to be performed by the system.

The corrective action that is instructed by the communicator 306 may include one or more of the non-exhaustive list of the following actions: informing a user that the entity has changed (specific changes may lead to specific notifications); activating a mechanism that is configured to repair the entity; outputting an alert signal to another component of the integrated circuit 100; outputting a hardware event; outputting an interrupt signal; and outputting a message to an external core device 208, 210, 212.

The current hash selector 312 is further configured to insert the first hash value $H_{1,T}$ into the hash store 304. Once inserted into the hash store 304, the first hash value becomes a prior hash value. That prior hash value may then be used for comparison to future hash values that are calculated from incoming data messages read from the interconnect circuitry 206. In one example, the first hash value $H_{1,T}$ is inserted into the hash store by the current hash selector 312 whilst it is being compared to its corresponding prior hash values by the comparator 314. That is, the comparison of the first hash value $H_{1,T}$ to its corresponding prior hash values and the storing of that hash value in the hash store 304 occur simultaneously. In an alternative example, the first hash value $H_{1,T}$ is stored in the hash store after it has been processed by the comparator 314. In other words, the comparison and storing of a first hash value may happen either within the same clock cycle, or within consecutive clock cycles.

The integrated circuit chip illustrated in FIG. 2 includes three monitoring devices 214, 216, 218. As mentioned above, the chip may alternatively include any number of monitoring devices. For chips that include a plurality of monitoring devices, each of these devices may be responsible for calculating and comparing hash values for a different subset of data values that are obtained from a first data message $Y_{1,T}$. That is, a first monitoring device may calculate and compare a first hash value $H_{1,T}$ for a subset of data values $X_1, X_2 \ldots X_N$. A second monitoring device may calculate and compare a second hash value $H_{2,T}$ for subsets $X_2, X_3 \ldots X_{N+1}$. A third monitoring device may calculate and compare a first hash value $H_{1,T}$ for subsets $X_3, X_4 \ldots X_{N+2}$. In this way, each monitoring device may perform processing for its subset of data values for the data message concurrently. This will further reduce the latency associated with the processing of sensor data.

Figure 4:
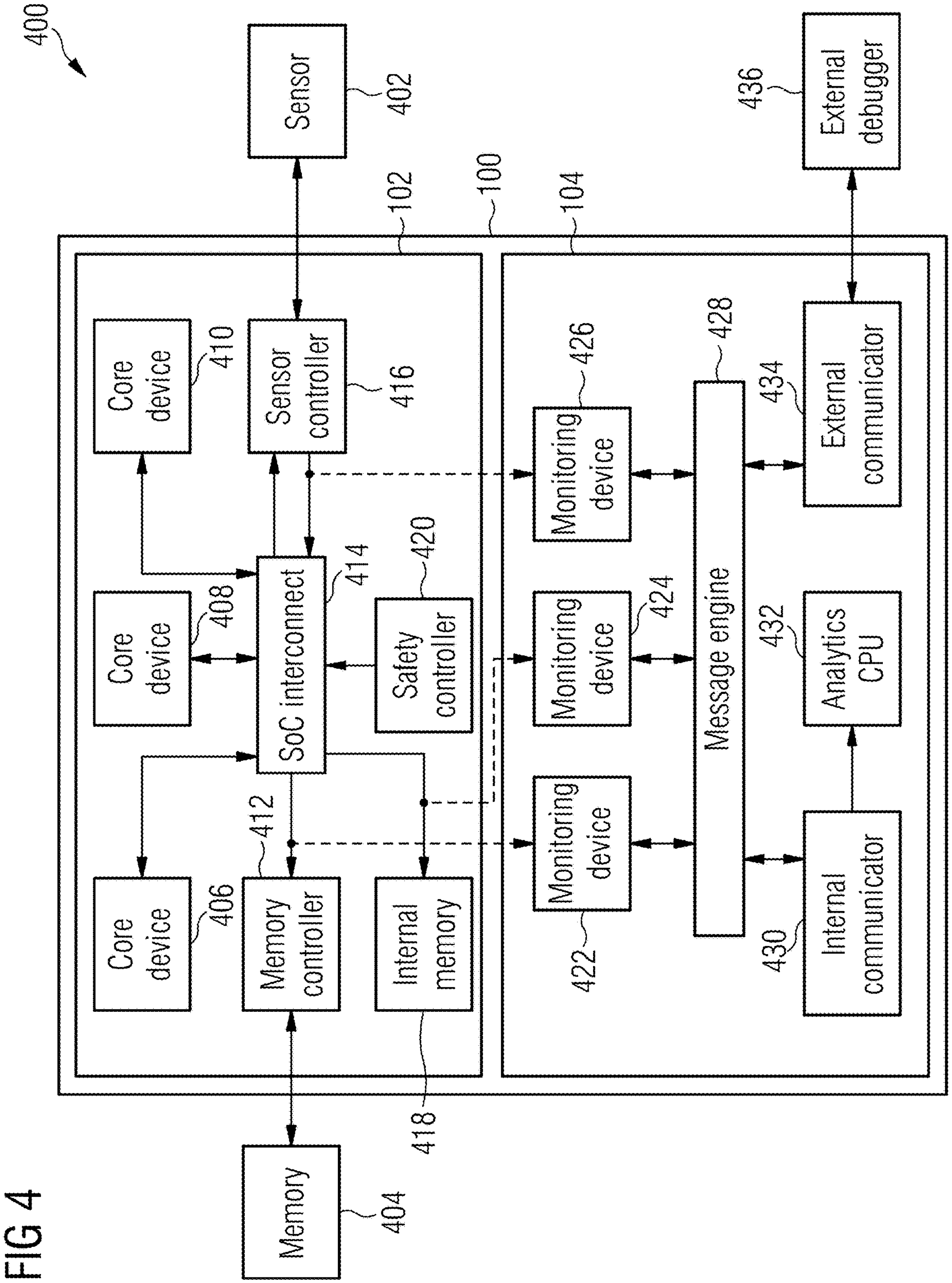
FIG. 4 is a schematic drawing of an alternative exemplary system for monitoring data messages using an integrated circuit chip device.

FIG. 4 is a schematic drawing of an alternative exemplary system for monitoring data messages using an integrated circuit chip device. As with FIG. 2, the system includes a sensor 402 connected to an external memory 404 by the SoC 100. The SoC further includes system circuitry 102 and monitoring circuitry 104 configured to monitor the system circuitry 102. The system circuitry 102 includes core devices 406, 408, 410, 418, 420 that correspond to core devices 208, 210, 212 in FIG. 2. The monitoring circuitry includes monitoring devices 422, 424, 426 that correspond to monitoring devices 214, 216, 218 in FIG. 2. Core device 420 is an output module and is described in further detail below. Core device 418 is an internal memory, or an on-chip memory. In one example, the on-chip memory 418 may be used to store data messages that are recorded by the sensor 402 in addition to the external memory 404. In another example, data messages from the sensor 402 may be written to only one of the external memory 404 or the on-chip memory 418. The memory that data messages are written to may be selected in dependence on the characteristics of that memory. Examples of characteristics that may determine whether data messages are written to a given memory include the amount of storage that it includes, the latency associated with writing data messages to it (which is a function of how far it is located from the sensor) and how much bandwidth it supports.

The interconnect circuitry of system circuitry 102, as illustrated in FIG. 4, further includes a memory controller 412 and a sensor controller 416. The sensor controller 416 is connected to both the sensor 402 and an SoC interconnect 414. The sensor controller 416 is responsible for transmitting instructions to the sensor 402 and controlling the performance of the sensor. The sensor controller 416 is further responsible for receiving data messages that have been recorded by the sensor 402 and transmitting those messages to other components of the system circuitry 102 via the SoC interconnect 414. The memory controller 412 is connected to both the memory 404 and the SoC interconnect 414. The memory controller 412 is responsible for both receiving data messages from the SoC interconnect to be written to, or stored in, the memory, and for transmitting stored data messages to the core devices via the SoC interconnect 414.

The SoC interconnect 414 is connected to core devices 406, 408, 410, 418, 420, the sensor controller 416, and the memory controller 412. The SoC interconnect 414 is therefore responsible for transferring data messages between the sensor 402 (via the sensor controller 416), the memory 404 and the core devices. The topology of the SoC interconnect is SoC dependent but may include any one or combination of the following types of network to transport communications around the system circuitry: a bus network, a ring network, a tree network, or a mesh network. In one example, the SoC interconnect 414 is a data bus.

Both the system circuitry 102 and the monitoring circuitry 104 illustrated in FIG. 4 include one or more output modules 420, 432, 436. The output modules are configured to perform a corrective action in response to a signal received by either a core device 406, 408, 410 or a monitoring device 422, 424, 426. Output module 420 is a safety controller. The safety controller 420 is configured to perform one or more actions to provide the safety of the system in which the integrated circuit chip is implemented. For example, if the integrated circuit chip 100 is implemented within a moving vehicle, the safety controller may be configured to apply the brakes to the system. Output module 432 is an analytics CPU. The analytics CPU is configured to perform further analysis on data that has been output by either a core device 406, 408, 410 or monitoring device 422, 424, 426, in order to establish why a sensor failure has occurred.

The analytics CPU is connected to the one or more monitoring devices 422, 424, 426 by a message engine 428 and an internal communicator 430. The message engine 428 connects all components of the monitoring circuitry together and is configured to transmit messages between these components. As with the SoC interconnect 414, the topology of the message engine is SoC dependent but may include any one or combination of the following types of network to transport communications around the system circuitry: a bus network, a ring network, a tree network, or a mesh network. In one example, the message engine 428 is a data bus. The internal communicator 430 is configured to relay messages between the analytics CPU and the message engine 428.

Output module 436 is an external debugger. The external debugger 436 is used to resolve defects or problems within the integrated circuit chip 100 or surrounding system that is responsible for the sensor failure. Tactics used by the external debugger 436 may include interactive debugging, control flow analysis, unit testing, integration testing, log file analysis, monitoring at the application or system level, memory dumps, and/or profiling. The external debugger 436 is connected to the message engine 428 by an external communicator 434. The external communicator 434 is configured to relay messages between the external debugger 436 and the message engine 428.

FIG. 5 is a flowchart of an exemplary method of monitoring messages from a sensor using an integrated circuit chip device as illustrated in FIG. 2 or 4. As mentioned above, the data messages include data measured from a sensor 202, 204 connected to the integrated circuit chip 100. The method begins at act 502, where a first data message $Y_{1,T}$ is read from the interconnect circuitry 206 of the integrated circuit using the one or more monitoring devices 214, 216, 218. The first data message $Y_{1,T}$ is recorded by the sensor 202 for a first clock cycle T. The first data message $Y_{1,T}$ is received by the data buffer 308 located within the processor 302 of the monitoring device. In one example, the data message $Y_{1,T}$ includes only one subset of data values $X_1$. In an alternative example, the data message includes a plurality of subsets of data values.

At act 504, the hash calculator 310 of processor 302 of the monitoring device 214 calculates a first data hash, with hash value $H_{1,T}$, for the first data message $Y_{1,T}$. As summarized above, the first hash value $H_{1,T}$ may represent all of the data values that are in a received data message or may alternatively represent only a subset of data values included within that data message. Once the first hash value $H_{1,T}$ has been calculated, that hash value is transmitted to the current hash selector 312. The current hash selector 312 uses the first hash value $H_{1,T}$ to look up corresponding prior hash values that are stored in the hash store 304. Those corresponding prior hash values are read from the hash store 304 by the comparator 314.

At act 506, the comparator 314 compares the first hash value $H_{1,T}$ to one or more prior hash values $H_{1,T-1} \ldots H_{1,T-M}$ stored in a hash store 304. As described above, each prior hash value stored in the hash store corresponds to a data message that was read from the interconnect circuitry 206 prior to the first data message. In one example, the first hash value is compared to only one prior hash value $H_{1,T-1}$. In an alternative example, the first hash value is compared to a plurality of consecutive prior hash values $H_{1,T-1}$ to $H_{1,T-M}$. The difference between the first hash value $H_{1,T}$ and the one or more prior hash values $H_{1,T-1} \ldots H_{1,T-M}$ is then compared to a predetermined threshold that is stored within the monitoring device 214.

At act 508, the comparator 314 compares the difference between the first hash value $H_{1,T}$ and the one or more prior hash values $H_{1,T-1}, H_{1,T-2} \ldots H_{1,T-M}$ to the predetermined threshold $W_1$. If the comparator 314 determines that the difference between the first hash value and at least one of the one or more prior hash values is greater than the predetermined threshold $W_1$, the method proceeds to act 510 at which the communicator 306 instructs an output module 220 of the integrated circuit to perform a corrective action. In response to this instruction, the output module 220 performs a corrective action. If the comparator 314 determines that the difference between the first hash value and the one of the one or more prior hash values is not greater than the predetermined threshold $W_1$ (i.e., that the difference is greater than or equal to $W_1$), then no instruction is transmitted by the communicator 306. Thus, the one or more output modules 220 does not perform a corrective action. The method instead skips act 510 and proceeds to act 512.

At act 510, if the comparator 314 determines that the difference between the first hash value and at least one of the prior hash values is above the predetermined threshold, then the comparator outputs a signal to the communicator 306. On receiving this signal, the communicator 306 instructs the performance of a corrective action. That is, the communicator 306 transmits one or more instructions to one or more modules that are external to the monitoring device 214. The instructions are indicative of a corrective action that is to be performed by the system.

At act 512, the first hash value $H_{1,T}$ is stored in the hash store 304. The first hash value therefore becomes a prior hash value and may be compared to subsequent incoming hash values to determine whether these subsequent hash values indicate the occurrence of a change in the entity being monitored by the sensor 202. The method then proceeds to act 514, where $Y_{1,T}$ is replaced with $Y_{1,T+1}$ as an input to act 502. That is, a data message recorded by the sensor at a subsequent clock cycle to the clock cycle at which $Y_{1,T}$ is recorded is received by the data buffer 308. The subsequent data message $Y_{1,T+1}$, is used by the hash calculator 310 to calculate a new hash value $H_{1,T+1}$ at act 504, and that new hash value is compared to prior hash values $H_{1,T}$. $H_{1,T-1}$, $H_{1,T-2} \ldots H_{1,T-M}$, and so on.

The method illustrated in FIG. 5 is suitable when the hash values calculated by the hash calculator 310 are similar for similar data values. Where the hash values for similar data values are similar, a threshold value $W_1$ may be used to establish to what extent hash values change over consecutive clock cycles.

FIG. 6 is a flowchart illustrating an alternative exemplary method of monitoring messages from a sensor using an integrated circuit chip device as illustrated in FIG. 2 or 4, in which similar hash values are not generated for similar data values. That is, the hash values calculated by hash calculator 310 for similar data values may have significantly different values, with the difference between hash values being unrelated to the difference between the data values themselves. In this example, a consistent threshold indicating the extent to which hash values change over consecutive clock cycles is not possible. The identification of a change in the entity monitored by the sensor may instead be determined by observing the equality between hash values. That is, a first hash value is the different to one or more prior hash values, it may be determined that a change in the entity has occurred.

Acts 602 to 604 of FIG. 6 correspond to acts 502 to 506 of FIG. 5. That is, at act 602, a first data message $Y_{1,T}$ is read from the interconnect circuitry 206 of the integrated circuit using the one or more monitoring devices 208, 210, 212. At act 604, the hash calculator 310 of processor 302 of the monitoring device 214 calculates a first hash value $H_{1,T}$ for the first data message $Y_{1,T}$.

At act 608, the comparator 314 compares the difference between the first hash value $H_{1,T}$ and a prior hash value $H_{1,T-Z}$, where Z=1, 2 . . . M. If the comparator 314 determines that $H_{1,T}$ is not equal to $H_{1,T-Z}$, or in other words whether $|H_{1,T}-H_{1,T-Z}|\neq 0$, the method proceeds to act 610 at which the communicator 306 instructs an output module 220 of the integrated circuit to perform a corrective action. In response to this instruction, the output module 220 performs a corrective action. If the comparator 314 determines that $H_{1,T}$ is equal to $H_{1,T-Z}$, or in other words that $|H_{1,T} H_{1,T-Z}|=0$, then no instruction is transmitted by the communicator 306. Thus, the one or more output modules 220 does not perform a corrective action. The method instead skips act 610 and proceeds to act 612.

Acts 610 to 614 of FIG. 6 correspond to acts 510 to 514 of FIG. 5. That is, at act 610, the communicator 306 instructs an output module 220 of the integrated circuit to perform a corrective action. At act 612, the first hash value $H_{1,T}$ is stored in the hash store 304. At act 614, $Y_{1,T}$ is replaced with $Y_{1,T+1}$ as an input to act 602.

As mentioned above, in one example, the comparator 314 determines whether the difference between the first hash value and each prior hash value for a predetermined number of prior hash values P has been met, where P is defined as a fraction of M. M is the total number of prior hash values to be compared against first hash value $H_{1,T}$ by the comparator 314. In a further implementation of this example, the comparator 314 may compare the number of prior hash values for which $|H_1-H_{1,T-Z}|>W_1$ to a plurality of predefined numbers of hash values $P_1$, $P_2$ . . . $P_N$. Each predefined number $P_1$ corresponds to a confidence value indicating how certain the monitoring device is that a sensor failure has occurred. That is, the comparator 314 may derive a first predefined number $P_1$, where $P_1$=M/2. So, if the number of prior hash values for which $|H_1-H_{1,T-Z}|>W_1$ is greater than $P_1$, the comparator may determine that it is "very confident" that a change in the entity being monitored by the sensor has occurred. The comparator 314 may further derive a second predefined number $P_2$, where $P_2$=M/4. So, if the number of prior hash values for which $|H_1-H_{1,T-Z}|>W_1$ is less than $P_1$ but greater than $P_2$, the comparator 314 may determine that it is "somewhat confident" that a change in the entity being monitored by the sensor has occurred. The comparator 314 may have access to any amount of predefined numbers $P_1$, $P_2$ . . . $P_N$, where each predefined number is associated with a confidence value that indicates a different likelihood that a change in the entity being monitored by the sensor has occurred. The predefined numbers and corresponding confidence levels may be stored in a memory within the monitoring device 214.

As has been mentioned above, in one example the sensor that is connected to the integrated circuit chip is a camera, and each data message that is read by the one or more monitoring devices of the integrated circuit chip is an image frame or a portion thereof that has been captured for a first clock cycle T. That is, if the comparator 314 of the processor 302 of monitor 214 determines that the difference between the first hash value $H_1$ and at least one corresponding prior hash value $H_{1,T-1}$, $H_{1,T-2}$ etc. stored in the hash store is above a predetermined threshold $W_1$, that determination indicates that the portion of the frame that has been used to calculate $H_1$ indicates either where a change or what type of change in the entity being monitored has occurred.

In one implementation of the example in which the sensor is a camera, the integrated circuit chip described above may be inserted into an industrial setting, such as a production line. In this example, the one or more output modules 220 include a manufacturing safety controller, which, along with or instead of an operator, is alerted if a change in a production line action or output has occurred. The one or more corrective actions that may be instructed by the communicator 306 of a monitoring device 214 may therefore include the following: notifying an operator that an error is detected on a production line; deactivating subsystems that depend on the particular output of the production line for their operation; activating an alarm; and informing the manufacturing safety controller of the change, so that the safety controller may determine a specific action to take.

Figure 7:
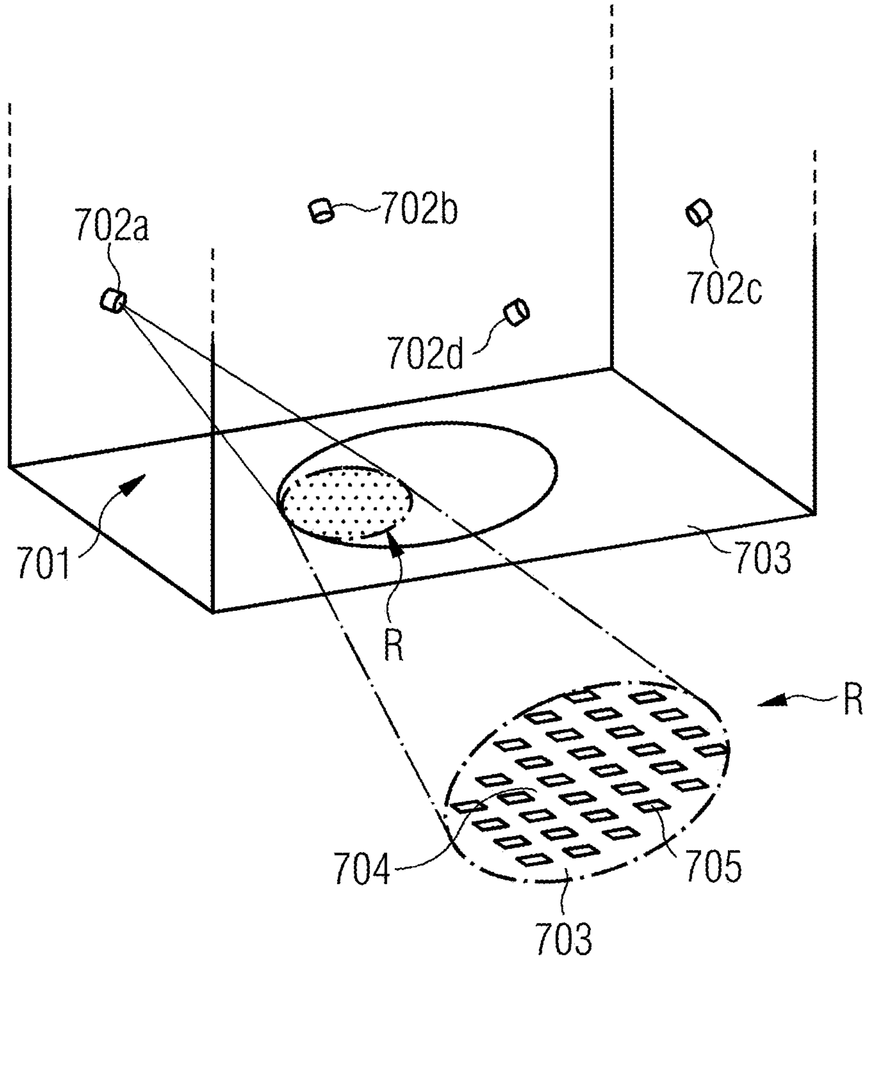
FIG. 7 is a schematic representation of an illustrative implementation of an embodiment.

FIG. 7 is a schematic representation of an illustrative implementation of an embodiment. The reactor hall 701 of a nuclear reactor is monitored by four image cameras 702*a*, 702*b*, 702*c*, 702*d*, that are arranged to view the floor 703 of the reactor hall 701. Each camera 702*a*, 702*b*, 702*c*, 702*d* monitors a set area of the floor 703 for any indication that there is an issue with the integrity of the floor 703 and consequently, potentially, the reactor itself. In normal use, each camera 702*a*, 702*b*, 702*c*, 702*d* relays image frames that are virtually identical. Hence when, as described above with respect to FIG. 5, the difference between the first hash value $H_{1,T}$ and the one or more prior hash values $H_{1,T-1}$, $H_{1,T-2}$ . . . $H_{1,T-M}$ is compared to the predetermined threshold $W_1$ for each camera 702*a*, 702*b*, 702*c*, 702*d*, the difference is well below the predetermined threshold $W_1$. However, as part of the monitoring process one of the cameras 702*a* picks up a crack 704 between rod covers 705 in the region R of the floor 703 it is assigned to (as highlighted in the figure). In the nuclear industry, the risk to safety from issues with a reactor is extremely high, hence notification of issues is required on a very short time scale of microseconds or less. A first image frame captured by the camera 702*a* shows the expected image of the floor 703, but a second, subsequent image frame shows the initials stages of a crack appearing. Whilst the hash value $H_{1,T}$ for the first image frame is virtually identical to the one or more prior hash values $H_{1,T-1}$, $H_{1,T-2}$ . . . $H_{1,T-M}$ it is compared with, the hash value $H_{1,T+1}$ for the second image frame is different, and when compared to the stored hash values $H_{1,T-1}$, $H_{1,T-2}$ . . . $H_{1,T-M}$, exceeds the predetermined threshold $W_1$. This causes the comparator 314 to output a signal to the communicator 306, which transmits one or more instructions to one or more modules that are external to the camera 702*a*, enabling the raising of an alarm.

Whilst in one example the sensor is an image sensor, any type of sensor that is capable of recording continuous data may alternatively be connected to the integrated circuit chip. Examples of alternative sensors from which messages may be monitored include temperature sensors, proximity sensors, accelerometers, pressure sensors, flow sensors, humidity sensors or touch sensors. For example, the sensor may be a thermostat, and the integrated circuit chip may be used to monitor the temperature recorded by the thermostat.

The systems and methods described herein provide for a significant reduction in the amount of time taken to identify a change in an entity when compared to corresponding systems that rely on software implementation. That is, the calculation and comparison of hash values by the monitoring devices may be performed in only a few hardware clock cycles. Once a change in an entity has been identified by one or more monitoring devices, those devices may provide that a suitable output module is instructed to perform a corrective action using a low latency mechanism, to further reduce time delays.

The SoC described is suitably incorporated within a computing-based device. The computing-based device may be an electronic device. Suitably, the computing-based device includes one or more processors for processing computer executable instructions to control operation of the device in order to implement the methods described herein. The computer executable instructions may be provided using any computer-readable media such as a memory. Some of the methods described herein may be performed by software in machine readable form on a tangible storage medium. Software may be provided at the computing-based device to implement the some of the methods described herein.

The above description describes the system circuitry and monitoring circuitry as being included on the same SoC. In an alternative implementation, the system circuitry and monitoring circuitry are included across two or more integrated circuit chips of an MCM. In an MCM, the integrated circuit chips may be stacked or located adjacently on an interposer substrate. Some system circuitry may be located on one integrated circuit chip and other system circuitry located on a different integrated circuit chip of the MCM. Similarly, the monitoring circuitry may be distributed across more than one integrated circuit chip of the MCM. Thus, the method and apparatus described above in the context of a SoC also apply in the context of an MCM.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of monitoring messages from a sensor using an integrated circuit, the messages comprising data measured by the sensor, the method comprising:

reading a first message from interconnect circuitry of the integrated circuit, the interconnect circuitry connecting the sensor to one or more core devices configured to process the first message;

calculating a first hash value for the first message;

comparing the first hash value to one or more prior hash values stored in a hash store, wherein each prior hash value of the one or more prior hash values corresponds to a message that was read from the interconnect circuitry prior to the first message; and performing a corrective action when a difference between the first hash value and at least one prior hash value of the one or more prior hash values stored in the hash store is above a predetermined threshold.

2. The method of claim 1, further comprising:

storing the first hash value in the hash store.

3. The method of claim 2, wherein the first hash value is stored in the hash store simultaneously to the comparing of the first hash value to the one or more prior hash values.

4. The method of claim 1, further comprising:

buffering the first message before the first message is read by the one or more core devices.

5. The method of claim 4, wherein a size of the buffering corresponds to a number of data values that are used to calculate a data hash comprising the first hash value.

6. The method of claim 1, further comprising:

comparing the first hash value to a number M of prior hash values; and performing the corrective action when the difference between the first hash value and P prior hash values is above the predetermined threshold, where $1<P<M$.

7. The method of claim 6, further comprising:

deriving a confidence value corresponding to the P prior hash values for which the difference between the first hash value and each value of the P prior hash values is above the predetermined threshold.

8. The method of claim 6, wherein M is dynamically configurable.

9. The method of claim 1, wherein the corrective action is performed when the first hash value is different from at least one prior hash value of the one or more prior hash values stored in the hash store.

10. The method of claim 1, further comprising:

calculating a plurality of hash values for the first message, wherein each hash value of the plurality of hash values represents a portion of the first message, and wherein each hash value of the plurality of hash values for the first message is compared to at least one prior hash value of the one or more prior hash values that corresponds to the portion of the first message.

11. The method of claim 10, wherein the plurality of hash values calculated for the first message represent overlapping portions of the first message.

12. The method of claim 10, wherein the plurality of hash values calculated for the first message represent non-overlapping portions of the first message.

13. The method of claim 1, wherein the corrective action comprises informing a user that the data measured by the sensor is not reliable, disactivating components of the integrated circuit that depend on the data obtained from the sensor, activating a mechanism configured to repair the sensor, or a combination thereof.

14. The method of claim 1, wherein the corrective action comprises outputting an alert signal to another component of the integrated circuit.

15. The method of claim 1, wherein the corrective action comprises outputting a hardware event, outputting an interrupt signal, or outputting a message to an external core device.

16. The method of claim 1, wherein the sensor is an image sensor, and wherein each message that is read from the interconnect circuitry is at least a portion of a frame that is captured by the image sensor.

17. The method of claim 1, wherein the sensor is an image sensor, and wherein each message that is read from the interconnect circuitry is a frame that is captured by the image sensor.

18. The method of claim 1, wherein the integrated circuit is a system on a chip.

19. The method of claim 1, wherein the interconnect circuitry is a data bus.

20. An integrated circuit chip for monitoring messages from a sensor, the messages comprising data measured by that sensor, the integrated circuit chip comprising:

interconnect circuitry configured to connect the sensor to a core device configured to process a first message;

a monitoring device configured to read the first message from the interconnect circuitry;

a hash store configured to store a plurality of prior hash values, wherein each prior hash value of the plurality of prior hash values corresponds to a message that was read from the interconnect circuitry prior to the first message; and a device configured to: calculate a first hash value for the first message; and compare the first hash value to one or more of the prior hash values of the plurality of prior hash values stored in the hash store, wherein the integrated circuit chip is configured to perform a corrective action when a difference between the first hash value and at least one prior hash value of the plurality of prior hash values stored in the hash store is above a predetermined threshold.

21. The integrated circuit chip of claim 20, wherein the device is a processor or a series of finite state machines.

* * * * *